(12) United States Patent
Proud et al.

(10) Patent No.: US 11,966,922 B2
(45) Date of Patent: Apr. 23, 2024

(54) ELECTRONIC SYSTEM FOR SCANNING AND MAPPING ENTITY PORTALS TO DISTRIBUTION PROCESSING SYSTEMS

(71) Applicant: BANK OF AMERICA CORPORATION, Charlotte, NC (US)

(72) Inventors: Lee Ann Proud, St. Augustine, FL (US); Joseph Benjamin Castinado, North Glenn, CO (US); Hosam Sonny ElHamahmy, Fort Mill, SC (US); David Gregg Kambour, Palm City, FL (US); Amy Marie Lamb, Waxhaw, NC (US); Jennifer Ann Maggart, Rockwall, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 406 days.

(21) Appl. No.: 17/410,593

(22) Filed: Aug. 24, 2021

(65) Prior Publication Data
US 2023/0064944 A1 Mar. 2, 2023

(51) Int. Cl.
*G06F 16/28* (2019.01)
*G06F 3/06* (2006.01)
*G06F 21/62* (2013.01)
*G06Q 20/40* (2012.01)
*G06F 21/31* (2013.01)

(52) U.S. Cl.
CPC ......... *G06Q 20/401* (2013.01); *G06F 3/0647* (2013.01); *G06F 16/288* (2019.01); *G06F 21/6245* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 5,239,647 A | 8/1993 | Anglin et al. | |
| 5,333,315 A | 7/1994 | Saether et al. | |
| 8,285,681 B2 | 10/2012 | Prahlad et al. | |
| 9,003,086 B1 | 4/2015 | Schuller et al. | |
| 9,578,088 B2 * | 2/2017 | Nickolov | H04L 67/34 |
| 9,734,169 B2 | 8/2017 | Redlich et al. | |

(Continued)

*Primary Examiner* — John A Follansbee
*Assistant Examiner* — Kamal M Hossain
(74) *Attorney, Agent, or Firm* — Moore & Van Allen PLLC; R. W. McCord Rayburn

(57) ABSTRACT

Systems, computer program products, and methods are described herein for scanning and mapping entity portals to distribution processing systems. The present invention may be configured to scan an entity portal of a distribution processing system to generate responses of the entity portal to test distributions, where the entity portal is associated with an entity, and where the distribution processing system processes distributions for the entity. The present invention may be configured to receive, from the entity portal, responses of the entity portal to the test distributions, where the responses include data associated with distributions processed by the distribution processing system for the entity. The present invention may be configured to determine, based on the data, resources offered by the entity to users, an accounting hierarchy of the entity, and settlement procedures for processing distributions for the entity and generate a mapping of the entity portal to another distribution processing system.

20 Claims, 4 Drawing Sheets

(56) References Cited

U.S. PATENT DOCUMENTS

| | | | |
|---|---|---|---|
| 9,846,905 B2* | 12/2017 | Katzin | G06Q 20/40 |
| 10,419,463 B2 | 9/2019 | Muddu et al. | |
| 10,541,938 B1 | 1/2020 | Timmerman et al. | |
| 11,023,441 B2 | 6/2021 | Mugali et al. | |
| 11,023,870 B2* | 6/2021 | Cottingham | G06Q 20/3265 |
| 11,074,248 B2 | 7/2021 | Hariharasubrahmanian et al. | |
| 11,233,822 B2 | 1/2022 | Hooda et al. | |
| 11,551,221 B2 | 1/2023 | Srinivasan | |
| 2005/0010919 A1* | 1/2005 | Ramanathan | G06F 8/61 |
| | | | 707/999.103 |
| 2008/0120240 A1 | 5/2008 | Ginter et al. | |
| 2014/0082479 A1* | 3/2014 | Guinane | G06F 40/143 |
| | | | 715/234 |
| 2015/0339779 A1* | 11/2015 | Meyer | G06Q 10/10 |
| | | | 705/4 |
| 2019/0066106 A1* | 2/2019 | Willis | G06Q 20/042 |
| 2020/0026710 A1 | 1/2020 | Przada et al. | |
| 2020/0380024 A1 | 12/2020 | Guha et al. | |
| 2021/0304205 A1* | 9/2021 | Saka | G06Q 20/108 |
| 2023/0062655 A1 | 3/2023 | Wan et al. | |

* cited by examiner

ELECTRONIC SYSTEM FOR SCANNING AND MAPPING ENTITY PORTALS TO DISTRIBUTION PROCESSING SYSTEMS

FIELD OF THE INVENTION

The present invention embraces an electronic system for scanning and mapping entity portals to distribution processing systems.

BACKGROUND

A distribution processing system may process distributions of resources from various channels on behalf of entities. The distribution processing system may have connections to various associations managing the channels and provide resource distribution authorization and/or settlement services to one or more entities managing source retainers for holding resources on behalf of the entities.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for scanning and mapping entity portals to distribution processing systems. The system may include at least one non-transitory storage device and at least one processing device coupled to the at least one non-transitory storage device, where the at least one processing device may be configured to scan an entity portal of a first distribution processing system to generate responses of the entity portal to test distributions, where the entity portal is associated with an entity, and where the first distribution processing system processes distributions for the entity. The at least one processing device may be configured to receive, from the entity portal, the responses of the entity portal to the test distributions, where the responses include data associated with distributions processed by the first distribution processing system for the entity, and determine, based on the data, resources offered by the entity to users, an accounting hierarchy of the entity, and settlement procedures for processing distributions for the entity. The at least one processing device may be configured to generate, based on the resources offered by the entity, based on the accounting hierarchy of the entity, and based on the settlement procedures for processing distributions for the entity, a mapping of the entity portal to a second distribution processing system and provide, to the second distribution processing system, the mapping of the entity portal.

In some embodiments, the entity portal is a first entity portal, and the mapping of the first entity portal configures the second distribution processing system to provide a second entity portal associated with the entity and process distributions entered into the second entity portal in a same manner as the first distribution processing system processes distributions entered into the first entity portal.

In some embodiments, the at least one processing device may be configured to, before scanning the entity portal of the first distribution processing system, receive, from the entity, authentication credentials to access the entity portal and provide, to the first distribution processing system, the authentication credentials.

In some embodiments, the at least one processing device may be configured to, when scanning the entity portal of the first distribution process system, perform screen-scraping on the entity portal, test distributions on the entity portal, traceable test distributions on the entity portal, and/or the like.

In some embodiments, the at least one processing device may be configured to determine, based on the data, rules established between the first distribution processing system and the entity for the first distribution processing system to process distributions for the entity. Additionally, or alternatively, the at least one processing device may be configured to, when generating the mapping of the entity portal to the second distribution processing system, generate the mapping based on the rules. In some embodiments, the at least one processing device may be configured to, after determining the rules, determine whether the second distribution processing system can be configured to comply with the rules. Additionally, or alternatively, the at least one processing device may be configured to, based on determining that the second distribution cannot be configured to comply with the rules, a notification.

In some embodiments, the at least one processing device may be configured to identify, based on the data, one or more physical terminals, identify, based on the data, one or more virtual terminals, and identify, based on the data, locations of the one or more physical terminals and the one or more virtual terminals.

In some embodiments, the entity portal is a first entity portal, the responses are first responses, the data is first data, the resources are first resources, the accounting hierarchy is a first accounting hierarchy, the settlement procedures are first settlement procedures, and the mapping is a first mapping. Additionally, or alternatively, the at least one processing device may be configured to scan a second entity portal of a third distribution processing system to generate second responses of the second entity portal to test distributions, where the second entity portal is associated with the entity, and where the third distribution processing system processes distributions for the entity. In some embodiments, the at least one processing device may be configured to receive, from the second entity portal, the second responses of the second entity portal to the test distributions, where the second responses include second data associated with distributions processed by the third distribution processing system for the entity. Additionally, or alternatively, the at least one processing device may be configured to determine, based on the second data, second resources offered by the entity to users, a second accounting hierarchy of the entity, and second settlement procedures for processing distributions for the entity. In some embodiments, the at least one processing device may be configured to generate, based on the second resources offered by the entity, based on the second accounting hierarchy of the entity, and based on the second settlement procedures for processing distributions for the entity, a second mapping of the second entity portal to a fourth distribution processing system. Additionally, or alternatively, the at least one processing device may be configured to provide, to the fourth distribution processing system, the second mapping of the entity portal.

In some embodiments, the at least one processing device may be configured to receive a request to change the entity portal and provide the request and the mapping of the entity portal to a maintenance system.

In some embodiments, the at least one processing device may be configured to, when scanning the entity portal, utilize a plurality of connectors, where each connector is configured to determine parameters for one or more data points from a data source, and where the parameters include the one or more data points, a connection to the data source, a location of the one or more data points within the data source, and a transformation of the one or more data points.

In some embodiments, the at least one processing device may be configured to, when scanning the entity portal and receiving the responses, generate, for each response, metadata identifying a test distribution that caused the entity portal to generate the response.

In some embodiments, the at least one processing device may be configured to, when generating the mapping of the entity portal to the second distribution processing system, identify, within the data, sensitive data and mask the sensitive data in the mapping of the entity portal.

In another aspect, the present invention embraces a computer program product for scanning and mapping entity portals to distribution processing systems. The computer program product may include a non-transitory computer-readable medium including code causing a first apparatus to scan an entity portal of a first distribution processing system to generate responses of the entity portal to test distributions, where the entity portal is associated with an entity, and where the first distribution processing system processes distributions for the entity. The computer program product may include a non-transitory computer-readable medium including code causing the first apparatus to receive, from the entity portal, the responses of the entity portal to the test distributions, where the responses include data associated with distributions processed by the first distribution processing system for the entity. The computer program product may include a non-transitory computer-readable medium including code causing the first apparatus to determine, based on the data, resources offered by the entity to users, an accounting hierarchy of the entity, and settlement procedures for processing distributions for the entity. The computer program product may include a non-transitory computer-readable medium including code causing the first apparatus to generate, based on the resources offered by the entity, based on the accounting hierarchy of the entity, and based on the settlement procedures for processing distributions for the entity, a mapping of the entity portal to a second distribution processing system. The computer program product may include a non-transitory computer-readable medium including code causing the first apparatus to provide, to the second distribution processing system, the mapping of the entity portal.

In some embodiments, the entity portal is a first entity portal, and the mapping of the first entity portal configures the second distribution processing system to provide a second entity portal associated with the entity and process distributions entered into the second entity portal in a same manner as the first distribution processing system processes distributions entered into the first entity portal.

In some embodiments, the non-transitory computer-readable medium may include code causing the first apparatus to, before scanning the entity portal of the first distribution processing system, receive, from the entity, authentication credentials to access the entity portal and provide, to the first distribution processing system, the authentication credentials.

In some embodiments, the non-transitory computer-readable medium may include code causing the first apparatus to, when scanning the entity portal of the first distribution process system, perform screen-scraping on the entity portal, test distributions on the entity portal, traceable test distributions on the entity portal, and/or the like.

In some embodiments, the non-transitory computer-readable medium may include code causing the first apparatus to determine, based on the data, rules established between the first distribution processing system and the entity for the first distribution processing system to process distributions for the entity.

In yet another aspect, a method for scanning and mapping entity portals to distribution processing systems is presented. The method may include scanning an entity portal of a first distribution processing system to generate responses of the entity portal to test distributions, where the entity portal is associated with an entity, and where the first distribution processing system processes distributions for the entity. The method may include receiving, from the entity portal, the responses of the entity portal to the test distributions, where the responses include data associated with distributions processed by the first distribution processing system for the entity. The method may include determining, based on the data, resources offered by the entity to users, an accounting hierarchy of the entity, and settlement procedures for processing distributions for the entity. The method may include generating, based on the resources offered by the entity, based on the accounting hierarchy of the entity, and based on the settlement procedures for processing distributions for the entity, a mapping of the entity portal to a second distribution processing system. The method may include providing, to the second distribution processing system, the mapping of the entity portal.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
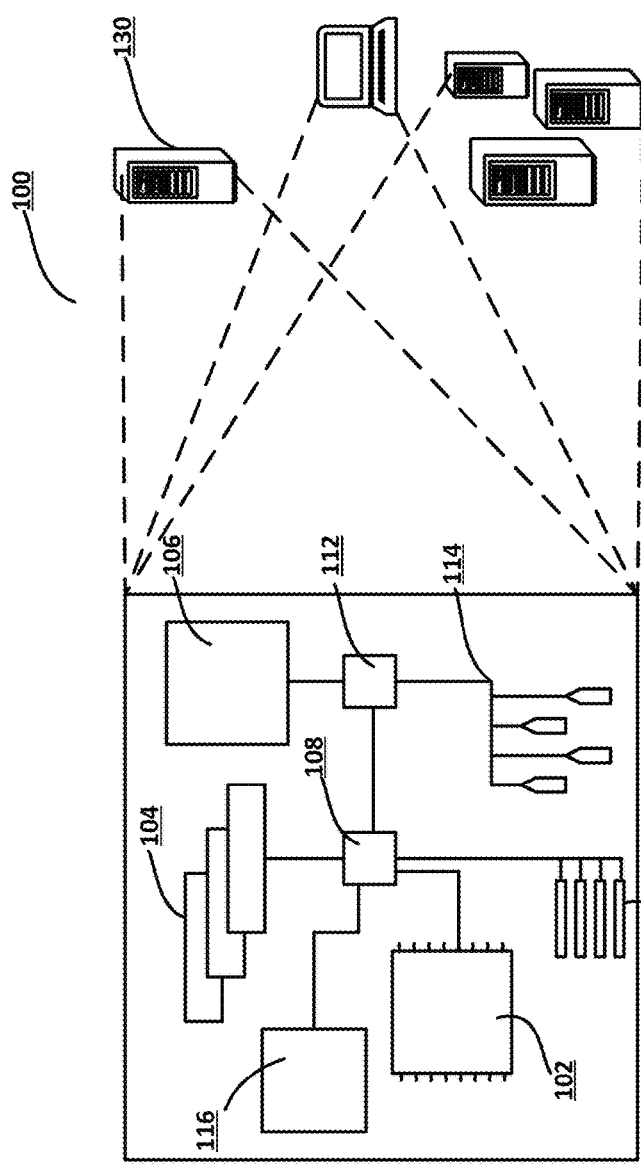
Figure 1:
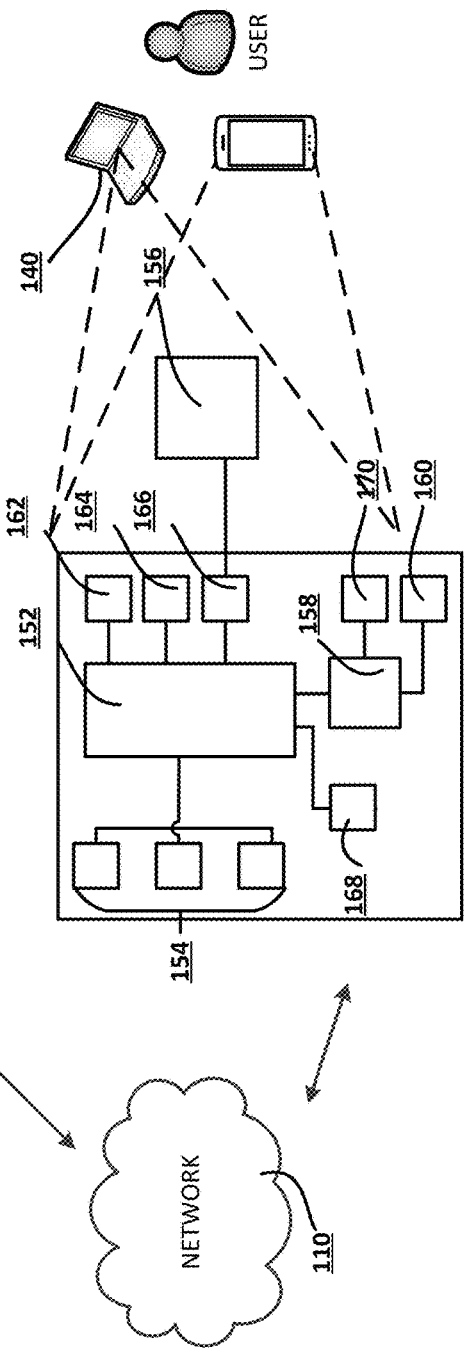
Figure 2:
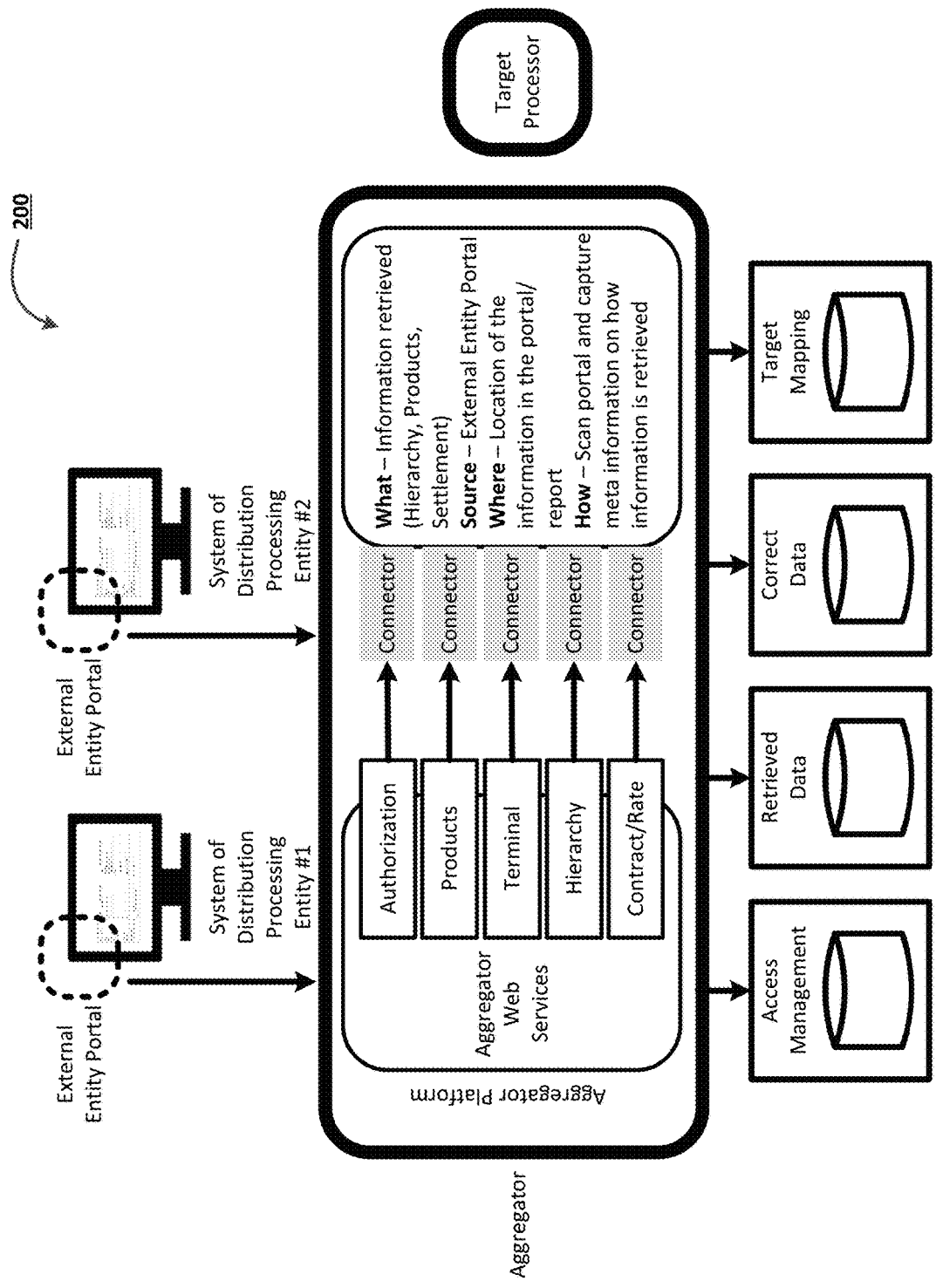
Figure 3:
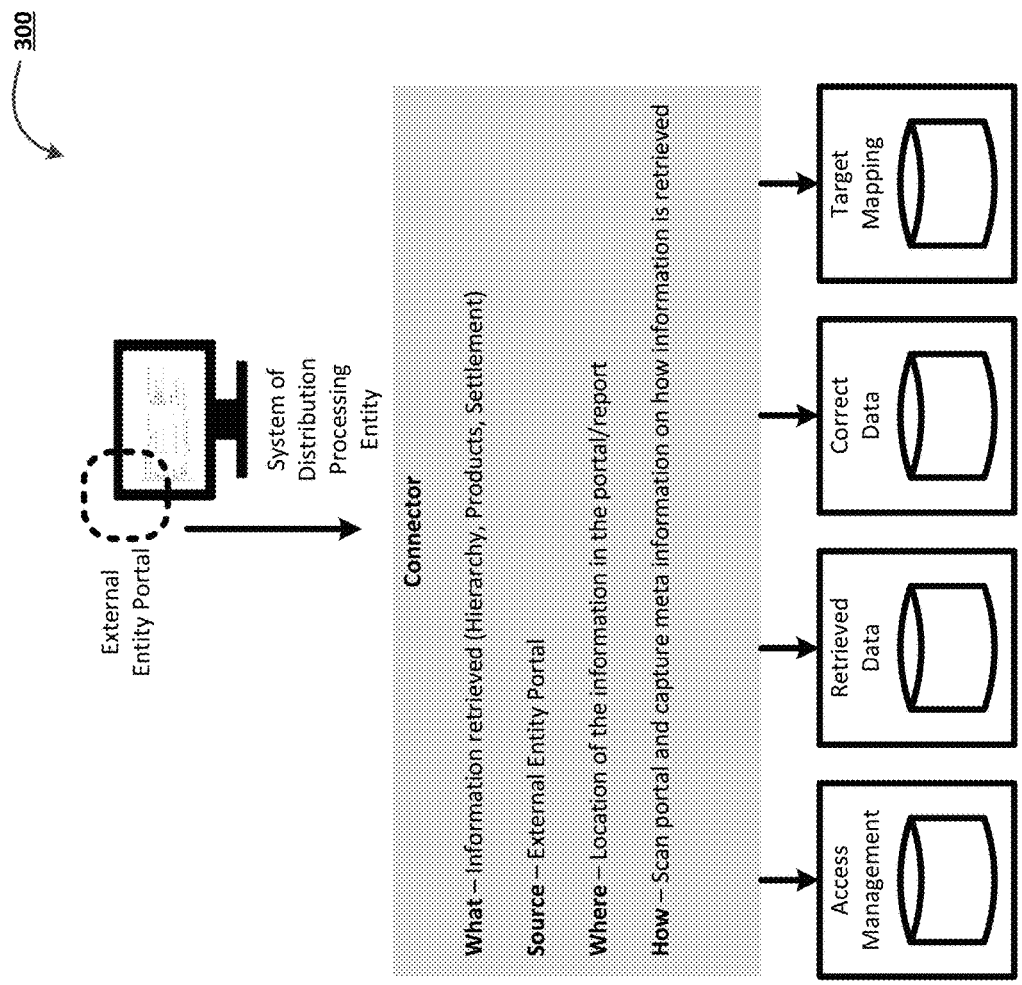
Figure 4:
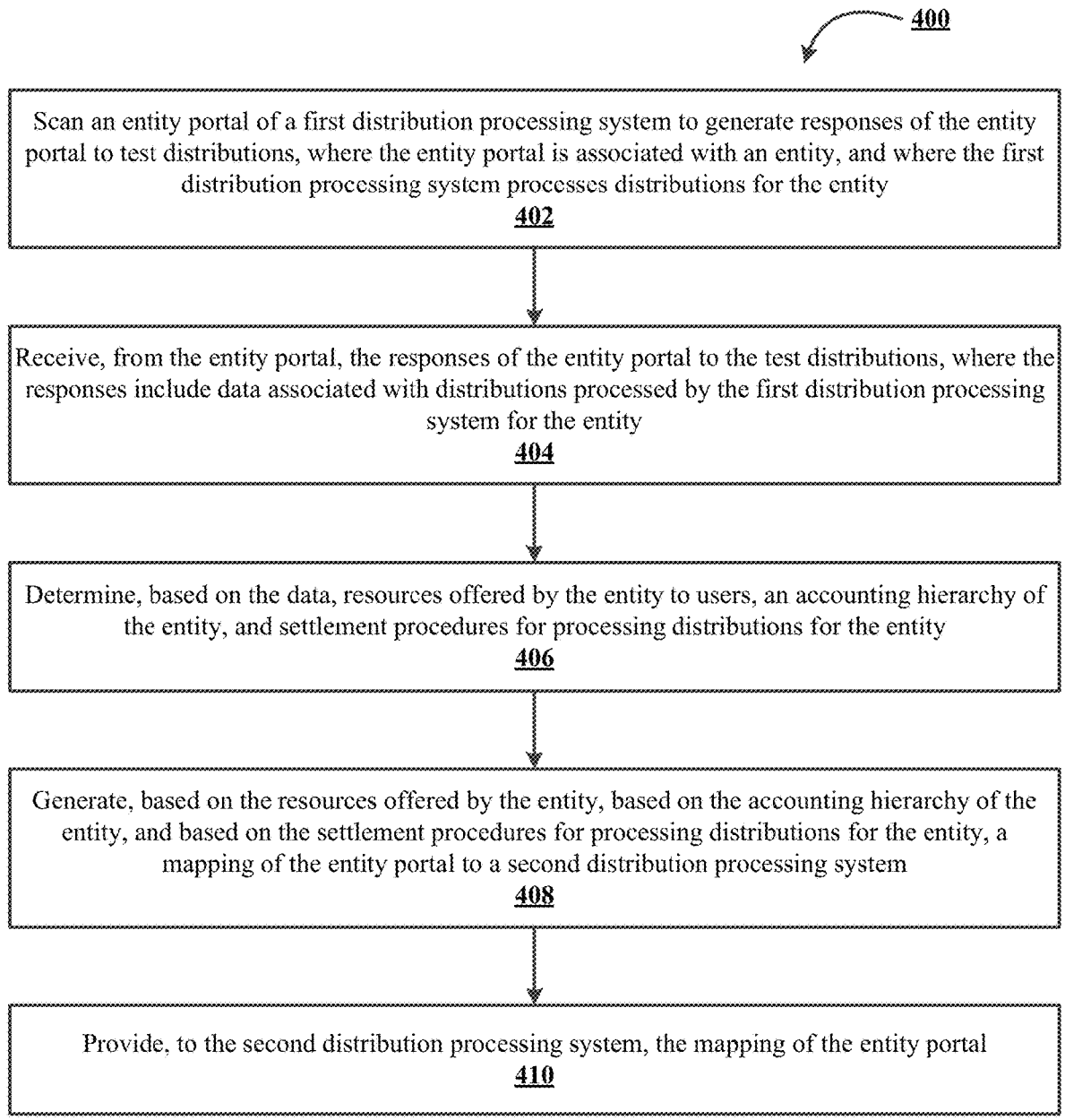

Having thus described embodiments of the invention in general terms, reference will now be made the accompanying drawings, wherein:

FIG. 1 illustrates technical components of a system for scanning and mapping entity portals to distribution processing systems, in accordance with an embodiment of the invention;

FIG. 2 illustrates a process flow for scanning and mapping entity portals to distribution processing systems, in accordance with an embodiment of the invention;

FIG. 3 illustrates a process flow for scanning and mapping entity portals to distribution processing systems, in accordance with an embodiment of the invention; and FIG. 4 illustrates a process flow for scanning and mapping entity portals to distribution processing systems, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As noted, a distribution processing system (e.g., a transaction processing system and/or the like) may process distributions of resources (e.g., transactions and/or the like) from various channels (e.g., credit cards, debit cards, and/or the like) on behalf of entities (e.g., merchants, service providers, and/or the like). The distribution processing system may have connections to various associations managing the channels (e.g., card associations, financial institutions, and/or the like) and provide resource distribution authorization and/or settlement services to one or more entities (e.g., financial institutions and/or the like) managing source retainers (e.g., accounts and/or the like) for holding resources on behalf of the entities.

When an entity establishes a relationship with a distribution processing entity, the distribution processing entity creates an entity portal (e.g., a merchant portal and/or the like) for the entity. However, the process to create such an entity portal requires a high volume of data collection, the complexity and volume of which increases greatly based on the size and/or scope of the entity (e.g., small entity, global entity, and/or the like). Furthermore, an entity may distribute the volume of the entity's distribution processing across multiple distribution processing entities, which may or may not be financial institutions. Such high volume and high complexity data collection consumes significant resources (e.g., financial resources, computing resources, network resources, and/or the like) associated with retrieving the data, checking the data, users manually entering data, and/or the like.

Additionally, in view of the significant resource cost associated with creating such entity portals, entities are discouraged from switching distribution processing entities even when another distribution processing entity may be capable of reducing the amount of resources used by the entity to obtain distribution processing services. Thus, the significant resource cost created by the high volume and high complexity data collection consumes additional resources (e.g., financial resources, computing resources, network resources, and/or the like) associated with increased resources used by the entity over time to obtain distribution processing services.

Some embodiments described herein provide a system, a computer program product, and/or a method for scanning and mapping entity portals to distribution processing systems. For example, a system (e.g., an electronic system for scanning and mapping entity portals to distribution processing systems and/or the like) may be configured to improve the efficiency and/or simplicity to onboard entities from one distribution processing platform to another or for an entity to expand their relationship on an existing distribution processing platform through the use of aggregators to automate the collection of pertinent transferable information for the purpose of establishing entity distribution processing. Based on entity authorization and mandate to initiate such an onboarding/or establishment of a distribution processing relationship, the system may leverage the use of capabilities such as screen-scraping, robotics, data capture, application programming interfaces (APIs), and the concept of open banking or open banking data.

In some embodiments, an entity may provide authorization to a distribution processing entity and/or a financial institution to initiate a scan of existing entity systems and/or entity infrastructure for the purpose of mapping hierarchy, physical and virtual terminal identification, location identification, and/or the like. Additionally, or alternatively, the system (e.g., of a distribution processing entity and/or a financial institution) may track and/or map entity systems based on distribution testing and/or other traceable distribution types. In some embodiments, the system may provide the ability for an entity to designate a request to maintenance and/or expand the volume of distribution processing provided to the entity by an existing distribution processing entity based on such a scan. For example, the system may permit the entity to select a portion and/or all of the volume of distribution processing provided to the entity by an existing distribution processing entity for an update and/or change. As another example, the system may permit the entity to designate a phased approach to build, maintain, expand, and/or the like a relationship between the entity and a distribution processing entity. In some embodiments, the system may be configured to ensure compliance with relevant laws, rules, and/or regulations associated with the use of entity data and to prevent unauthorized use of the system.

By scanning existing entity systems and/or entity infrastructure (e.g., entity portals and/or the like) and tracking and/or generating maps of entity systems, the system may conserve resources (e.g., financial resources, computing resources, network resources, and/or the like) that would otherwise be consumed by the high volume of data collection required to create and/or re-create an entity portal of the entity. For example, the system may, after scanning and generating a mapping, the system may provide the mapping to another distribution processing system, such that the mapping configures the other distribution processing system to process distributions and interact with the entity systems in the same manner as an existing system. By generating such a mapping, the system may reduce the requirement that a high volume of data be manually collected, checked, migrated, and/or the like, which conserves resources (e.g., financial resources, computing resources, network resources, and/or the like) and time associated with users collecting, checking, migrating, and/or the like the data.

FIG. 1 presents an exemplary block diagram of a system environment 100 for scanning and mapping entity portals to distribution processing systems within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for scanning and mapping entity portals to distribution processing systems, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more entity distribution scanning and mapping systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate a change and/or a modification to one or more of the systems, applications, services, and/or the like (e.g., similar to the system 130, running a system similar to the system 130, and/or the like). In some embodiments, the user input system and/or the entity distribution scanning and mapping systems associated with the entity may perform one or more of the steps described herein with respect to the process flows described herein with respect to FIGS. 2-4.

FIG. 2 illustrates a process flow 200 for scanning and mapping entity portals to distribution processing systems within a technical environment, in accordance with an embodiment of the invention. In some embodiments, an entity distribution scanning and mapping system and/or the like (e.g., similar to one or more of the systems described herein with respect to FIG. 1) may perform one or more of the steps of process flow 200.

As shown in FIG. 2, the process flow 200 may include an aggregator, a target processor (e.g., a target distribution processor), a system of distribution processing entity #1, a system of distribution processing entity #2, an access management system, a retrieved data system, a corrected data system, and a target mapping system. As also shown in FIG. 2, the system of distribution processing entity #1 and the system of distribution processing entity #2 may include an external entity portal (e.g., a merchant portal) through which the external entity may provide requests for distribution processing.

The aggregator may include an aggregator platform as well as aggregator web services which manage authorization, products, terminals, a hierarchy, and contracts/rates. As shown in FIG. 2, each of the aggregator web services may have one or more connectors. Although only one connector is shown in FIG. 2 for each of the aggregator web services, each aggregator web service may include a plurality of connectors. As described herein with respect to FIG. 3, each connector may be configured to obtain, retrieve, access, and/or the like one or more data points from a data source (e.g., the external entity portal).

In some embodiments, the process flow 200 may include obtaining, with the authorization service, authentication credentials from the external entity for accessing the external entity portal on the system of distribution processing entity #1 and/or the system of distribution processing entity #2. Additionally, or alternatively, the process flow 200 may include storing the authentication credentials with the access management system (e.g., in a data structure within the access management system and/or the like).

In some embodiments, the process flow 200 may include determining and/or identifying, with the products web service, which products and/or services the external entity provides to users (e.g., customers and/or the like). For example, the products web service may use connectors to retrieve information from the external entity portal (e.g., via screen-scraping and/or the like) to determine and/or identify which products and/or services the external entity provides to users. In some embodiments, the process flow 200 may include storing the identified products and/or services in the retrieved data system (e.g., in a data structure within the retrieved data system and/or the like).

As shown in FIG. 2, the process flow 200 may include identifying, with the terminal web service, terminals (e.g., physical and/or virtual terminals) used by the external entity (e.g., to initiate distributions, distribution processing, and/or the like) as well as locations of the terminals. For example, the terminal web service may use connectors to retrieve information from the external entity portal to identify the terminals and/or locations of the terminals used by the external entity. In some embodiments, the process flow 200 may include storing data associated with the identified terminals and/or locations in the retrieved data system (e.g., in a data structure within the retrieved data system and/or the like).

As shown in FIG. 2, the process flow 200 may include determining, with the hierarchy web service, a hierarchy of the external entity (e.g., an organizational hierarchy, an accounting hierarchy, a management hierarchy, and/or the like). For example, the hierarchy web service may use connectors to retrieve information from the external portal to determine how the external entity performs accounting for distributions. In some embodiments, the process flow 200 may include storing data associated with the hierarchy in the retrieved data system (e.g., in a data structure within the retrieved data system and/or the like).

As shown in FIG. 2, the process flow 200 may include determining, with the contract/rate web service, terms, conditions, rates, and/or the like between the external entity and the distribution processing entity #1 and/or the distribution processing entity #2 for processing distributions. For example, the contract/rate web service may use connectors to retrieve information from the external entity portal to determine the terms, conditions, rates, and/or the like (e.g., standard contracts, custom contracts, special contracts, and/or the like) between the external entity and the distribution processing entity #1 and/or the distribution processing entity #2. In some embodiments, the process flow 200 may include storing data associated with the terms, conditions, rates, and/or the like in the retrieved data system (e.g., in a data structure within the retrieved data system and/or the like).

As shown in FIG. 2, the process flow 200 may include determining, with the aggregator web services and the connectors, what information (e.g., hierarchy, products, settlement terms/procedures, and/or the like) was retrieved from the external entity portal, where the information was located in the external entity portal and/or a report, and how the information was retrieved. For example, the aggregator web services and the connectors may scan the external entity portal and capture meta information on how the information was retrieved.

As shown in FIG. 2, the process flow 200 may include correcting, with the aggregator, manually, and/or the like, the retrieved data. In some embodiments, the process flow 200 may include storing the corrected data in the correct data system (e.g., in a data structure within the correct data system and/or the like).

As shown in FIG. 2, the process flow 200 may include generating, based on the corrected data, a target mapping of the external entity portal. For example, the process flow 200 may include generating the target mapping such that, when the target processor is configured by the target mapping, the target processor will provide an entity portal to the external entity and process distributions in the same manner that the system of distribution processing entity #1 would process the distributions if entered in the external entity portal of the system of distribution processing entity #1. By generating such a target mapping, the target processor may be utilized by the external entity for distribution processing while conserving the resources (e.g., financial resources, computing resources, network resources, and/or the like) that would otherwise be consumed by the high volume of data collection required to create and/or re-create an entity portal of the external entity. In some embodiments, the process flow 200 may include storing the target mapping in the target mapping system (e.g., in a data structure within the target mapping system and/or the like).

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for scanning and mapping entity portals to distribution processing systems, in accordance with an embodiment of the invention. In some embodiments, an entity distribution scanning and mapping system and/or the like (e.g., similar to one or more of the systems described herein with respect to FIG. 1) may perform one or more of the steps of process flow 300. As shown in FIG. 3, the process flow 300 may include a connector (e.g., of an aggregator, an aggregator platform, an aggregator web service, and/or the like), a system of a distribution processing entity, an access management system, a retrieved data system, a corrected data system, and a target mapping system. As also shown in FIG. 3, the system of the distribution processing entity may include an external entity portal (e.g., a merchant portal) through which the external entity may provide requests for distribution processing.

In some embodiments, the connector of FIG. 3 may have similar characteristics, functions, and/or the like as those described with respect to the connectors of FIG. 2. Additionally, or alternatively, the connectors of FIG. 2 may have similar characteristics, functions, and/or the like as those described with respect to the connector of FIG. 3.

As shown in FIG. 3, the process flow 300 may include retrieving, with the connector, data from the external entity portal. For example, the connector may retrieve data from the external entity portal using screen-scraping, robotics, data capture, APIs, test distributions, traceable distributions, and/or the like. In some embodiments, the process flow 200 may include storing, based on the type of data retrieved, the retrieved data in the access management system (e.g., in a data structure within the access management system and/or the like), the retrieved data system (e.g., in a data structure within the retrieved data system and/or the like), the correct data system (e.g., in a data structure within the correct data system and/or the like), and/or the target mapping system (e.g., in a data structure within the target mapping system and/or the like).

As shown in FIG. 3, the process flow 300 may determining, with the connector, a hierarchy of the external entity (e.g., an organizational hierarchy, an accounting hierarchy, a management hierarchy, and/or the like). For example, the connector may retrieve information from the external portal to determine how the external entity performs accounting for distributions. In some embodiments, the process flow 300 may include determining and/or identifying, with the connector, which products and/or services the external entity provides to users (e.g., customers and/or the like). Additionally, or alternatively, the process flow 300 may include determining and/or identifying, with the connector, settlement terms/procedures established by the external entity for processing distributions.

As shown in FIG. 3, the process flow 300 may include determining, with the connector, a location of the retrieved data in the external entity portal. For example, the connector, based on retrieving the data, may generate location data identifying the location of the retrieved data in the external entity portal. In some embodiments, and as shown in FIG. 3, the process flow 300 may include scanning, generating, and/or capturing, with the connector, meta data associated with how the data was retrieved from the external entity portal.

In some embodiments, the process flow 300 may include using a plurality of connectors to perform the functions described herein. Additionally, or alternatively, each connector of the system may have a single function that demands a minimal amount of bandwidth on reuse. For example, each connector may provide a single function to retrieve a precise data point and/or multiple data points from the same source. In some embodiments, the connector will retrieve parameters including a target data point, a connec-tion to a data source, a location of the target data point within the data source, a transformation of the data point, and/or the like.

Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIG. 4 illustrates a process flow 400 for scanning and mapping entity portals to distribution processing systems, in accordance with an embodiment of the invention. In some embodiments, an entity distribution scanning and mapping system and/or the like (e.g., similar to one or more of the systems described herein with respect to FIG. 1) may perform one or more of the steps of process flow 400.

As shown in block 402, the process flow 400 may include scanning an entity portal of a first distribution processing system to generate responses of the entity portal to test distributions, where the entity portal is associated with an entity, and where the first distribution processing system processes distributions for the entity. For example, an entity distribution scanning and mapping system may scan an entity portal of a first distribution processing system to generate responses of the entity portal to test distributions. In some embodiments, the entity portal may be associated with an entity. Additionally, or alternatively, the first distribution processing system may process distributions for the entity.

As shown in block 404, the process flow 400 may include receiving, from the entity portal, the responses of the entity portal to the test distributions, where the responses include data associated with distributions processed by the first distribution processing system for the entity. For example, an entity distribution scanning and mapping system may receive, from the entity portal, the responses of the entity portal to the test distributions. In some embodiments, the responses may include data associated with distributions processed by the first distribution processing system for the entity.

As shown in block 406, the process flow 400 may include determining, based on the data, resources offered by the entity to users, an accounting hierarchy of the entity, and settlement procedures for processing distributions for the entity. For example, an entity distribution scanning and mapping system may determine, based on the data, resources offered by the entity to users, an accounting hierarchy of the entity, settlement procedures for processing distributions for the entity, and/or the like.

As shown in block 408, the process flow 400 may include generating, based on the resources offered by the entity, based on the accounting hierarchy of the entity, and based on the settlement procedures for processing distributions for the entity, a mapping of the entity portal to a second distribution processing system. For example, an entity distribution scanning and mapping system may generate, based on the resources offered by the entity, based on the accounting hierarchy of the entity, and based on the settlement procedures for processing distributions for the entity, a mapping of the entity portal to a second distribution processing system.

As shown in block 410, the process flow 400 may include providing, to the second distribution processing system, the mapping of the entity portal. For example, an entity distribution scanning and mapping system may provide, to the second distribution processing system, the mapping of the entity portal.

Process flow 400 may include additional embodiments, such as any single embodiment or any combination of embodiments described below and/or in connection with one or more other processes described elsewhere herein.

In a first embodiment, the entity portal may be a first entity portal, and the mapping of the first entity portal may configure the second distribution processing system to provide a second entity portal associated with the entity and process distributions entered into the second entity portal in a same manner as the first distribution processing system processes distributions entered into the first entity portal.

In a second embodiment alone or in combination with the first embodiment, the process flow 400 may include, before scanning the entity portal of the first distribution processing system receiving, from the entity, authentication credentials to access the entity portal and providing, to the first distribution processing system, the authentication credentials.

In a third embodiment alone or in combination with any of the first through second embodiments, the process flow 400 may include, when scanning the entity portal of the first distribution process system, performing screen-scraping on the entity portal, test distributions on the entity portal, traceable test distributions on the entity portal, and/or the like.

In a fourth embodiment alone or in combination with any of the first through third embodiments, the process flow 400 may include determining, based on the data, rules established between the first distribution processing system and the entity for the first distribution processing system to process distributions for the entity.

In a fifth embodiment alone or in combination with any of the first through fourth embodiments, the process flow 400 may include, when generating the mapping of the entity portal to the second distribution processing system, generating the mapping based on the rules.

In a sixth embodiment alone or in combination with any of the first through fifth embodiments, the process flow 400 may include, after determining the rules, determining whether the second distribution processing system can be configured to comply with the rules.

In a seventh embodiment alone or in combination with any of the first through sixth embodiments, the process flow 400 may include generating, based on determining that the second distribution cannot be configured to comply with the rules, a notification.

In an eighth embodiment alone or in combination with any of the first through seventh embodiments, the process flow 400 may include identifying, based on the data, one or more physical terminals, identifying, based on the data, one or more virtual terminals, identifying, based on the data, locations of the one or more physical terminals and the one or more virtual terminals, and/or the like.

In a ninth embodiment alone or in combination with any of the first through eighth embodiments, the entity portal may be a first entity portal, the responses may be first responses, the data may be first data, the resources may be first resources, the accounting hierarchy may be a first accounting hierarchy, the settlement procedures may be first settlement procedures, and the mapping may be a first mapping. Additionally, or alternatively, the process flow 400 may include: scanning a second entity portal of a third distribution processing system to generate second responses of the second entity portal to test distributions, where the second entity portal is associated with the entity, and where the third distribution processing system processes distributions for the entity; receiving, from the second entity portal, the second responses of the second entity portal to the test distributions, where the second responses include second data associated with distributions processed by the third distribution processing system for the entity; determining, based on the second data, second resources offered by the entity to users, a second accounting hierarchy of the entity, and second settlement procedures for processing distributions for the entity; generating, based on the second resources offered by the entity, based on the second accounting hierarchy of the entity, and based on the second settlement procedures for processing distributions for the entity, a second mapping of the second entity portal to a fourth distribution processing system; and providing, to the fourth distribution processing system, the second mapping of the entity portal.

In a tenth embodiment alone or in combination with any of the first through ninth embodiments, the process flow 400 may include receiving a request to change the entity portal and providing the request and the mapping of the entity portal to a maintenance system.

In an eleventh embodiment alone or in combination with any of the first through tenth embodiments, the process flow 400 may include, when scanning the entity portal, utilizing a plurality of connectors, where each connector is configured to determine parameters for one or more data points from a data source, and where the parameters include the one or more data points, a connection to the data source, a location of the one or more data points within the data source, and a transformation of the one or more data points.

In a twelfth embodiment alone or in combination with any of the first through eleventh embodiments, the process flow 400 may include, when scanning the entity portal and receiving the responses, generating, for each response, metadata identifying a test distribution that caused the entity portal to generate the response.

In a thirteenth embodiment alone or in combination with any of the first through twelfth embodiments, the process flow 400 may include, when generating the mapping of the entity portal to the second distribution processing system identifying, within the data, sensitive data and masking the sensitive data in the mapping of the entity portal. In some embodiments, the sensitive data may include personal data, financial data, health data, and/or the like.

Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for scanning and mapping entity portals to distribution processing systems, the system comprising:
   at least one non-transitory storage device; and
   at least one processing device coupled to the at least one non-transitory storage device, wherein the at least one processing device is configured to:
   scan a first entity portal of a first distribution processing system to generate first responses of the first entity portal to test distributions, wherein the first entity portal is associated with an entity, and wherein the first distribution processing system processes distributions for the entity;
   receive, from the first entity portal, the first responses of the first entity portal to the test distributions, wherein the first responses comprise first data associated with distributions processed by the first distribution processing system for the entity;
   determine, based on the first data, first resources offered by the entity to users, a first accounting hierarchy of the entity, and first settlement procedures for processing distributions for the entity;
   generate, based on the first resources offered by the entity, based on the first accounting hierarchy of the entity, and based on the first settlement procedures for processing distributions for the entity, a first mapping of the first entity portal to a second distribution processing system;
   provide, to the second distribution processing system, the first mapping of the first entity portal;
   scan a second entity portal of a third distribution processing system to generate second responses of the second entity portal to the test distributions, wherein the second entity portal is associated with the entity, and wherein the third distribution processing system processes distributions for the entity;
   receive, from the second entity portal, the second responses of the second entity portal to the test distributions, wherein the second responses comprise second data associated with distributions processed by the third distribution processing system for the entity;
   determine, based on the second data, second resources offered by the entity to users, a second accounting hierarchy of the entity, and second settlement procedures for processing distributions for the entity;
generate, based on the second resources offered by the entity, based on the second accounting hierarchy of the entity, and based on the second settlement procedures for processing distributions for the entity, a second mapping of the second entity portal to a fourth distribution processing system; and
provide, to the fourth distribution processing system, the second mapping of the second entity portal.

2. The system of claim 1, wherein the first mapping of the first entity portal configures the second distribution processing system to:
provide a third entity portal associated with the entity; and
process distributions entered into the third entity portal in a same manner as the first distribution processing system processes distributions entered into the first entity portal.

3. The system of claim 1, wherein the at least one processing device is configured to, before scanning the first entity portal of the first distribution processing system:
receive, from the entity, authentication credentials to access the first entity portal; and
provide, to the first distribution processing system, the authentication credentials.

4. The system of claim 1, wherein the at least one processing device is configured to, when scanning the first entity portal of the first distribution process system, perform at least one of screen-scraping on the first entity portal, test distributions on the first entity portal, or traceable test distributions on the first entity portal.

5. The system of claim 1, wherein the at least one processing device is configured to determine, based on the first data, rules established between the first distribution processing system and the entity for the first distribution processing system to process distributions for the entity.

6. The system of claim 5, wherein the at least one processing device is configured to, when generating the first mapping of the first entity portal to the second distribution processing system, generate the first mapping based on the rules.

7. The system of claim 5, wherein the at least one processing device is configured to, after determining the rules, determine whether the second distribution processing system can be configured to comply with the rules.

8. The system of claim 7, wherein the at least one processing device is configured to generate, based on determining that the second distribution processing system cannot be configured to comply with the rules, a notification.

9. The system of claim 1, wherein the at least one processing device is configured to:
identify, based on the first data, one or more physical terminals;
identify, based on the first data, one or more virtual terminals; and
identify, based on the first data, locations of the one or more physical terminals and the one or more virtual terminals.

10. The system of claim 1, wherein the at least one processing device is configured to:
receive a request to change the first entity portal; and
provide the request and the first mapping of the first entity portal to a maintenance system.

11. The system of claim 1, wherein the at least one processing device is configured to, when scanning the first entity portal, utilize a plurality of connectors, wherein each connector is configured to determine parameters for one or more data points from a data source, and wherein the parameters comprise the one or more data points, a connection to the data source, a location of the one or more data points within the data source, and a transformation of the one or more data points.

12. The system of claim 1, wherein the at least one processing device is configured to, when scanning the first entity portal and receiving the first responses, generate, for each first response, metadata identifying a test distribution that caused the first entity portal to generate the first response.

13. The system of claim 1, wherein the at least one processing device is configured to, when generating the first mapping of the first entity portal to the second distribution processing system:
identify, within the first data, sensitive data; and
mask the sensitive data in the first mapping of the first entity portal.

14. A computer program product for scanning and mapping entity portals to distribution processing systems, the computer program product comprising a non-transitory computer-readable medium comprising code causing a first apparatus to:
scan a first entity portal of a first distribution processing system to generate first responses of the first entity portal to test distributions, wherein the first entity portal is associated with an entity, and wherein the first distribution processing system processes distributions for the entity;
receive, from the first entity portal, the first responses of the first entity portal to the test distributions, wherein the first responses comprise first data associated with distributions processed by the first distribution processing system for the entity;
determine, based on the first data, first resources offered by the entity to users, a first accounting hierarchy of the entity, and first settlement procedures for processing distributions for the entity;
generate, based on the first resources offered by the entity, based on the first accounting hierarchy of the entity, and based on the first settlement procedures for processing distributions for the entity, a first mapping of the first entity portal to a second distribution processing system;
provide, to the second distribution processing system, the first mapping of the first entity portal;
scan a second entity portal of a third distribution processing system to generate second responses of the second entity portal to the test distributions, wherein the second entity portal is associated with the entity, and wherein the third distribution processing system processes distributions for the entity;
receive, from the second entity portal, the second responses of the second entity portal to the test distributions, wherein the second responses comprise second data associated with distributions processed by the third distribution processing system for the entity;
determine, based on the second data, second resources offered by the entity to users, a second accounting hierarchy of the entity, and second settlement procedures for processing distributions for the entity;
generate, based on the second resources offered by the entity, based on the second accounting hierarchy of the entity, and based on the second settlement procedures for processing distributions for the entity, a second mapping of the second entity portal to a fourth distribution processing system; and provide, to the fourth distribution processing system, the second mapping of the second entity portal.

15. The computer program product of claim 14, wherein the first mapping of the first entity portal configures the second distribution processing system to:
   provide a third entity portal associated with the entity; and
   process distributions entered into the third entity portal in a same manner as the first distribution processing system processes distributions entered into the first entity portal.

16. The computer program product of claim 14, wherein the non-transitory computer-readable medium comprises code causing the first apparatus to, before scanning the first entity portal of the first distribution processing system:
   receive, from the entity, authentication credentials to access the first entity portal; and
   provide, to the first distribution processing system, the authentication credentials.

17. The computer program product of claim 14, wherein the non-transitory computer-readable medium comprises code causing the first apparatus to, when scanning the first entity portal of the first distribution process system, perform at least one of screen-scraping on the first entity portal, test distributions on the first entity portal, or traceable test distributions on the first entity portal.

18. The computer program product of claim 14, wherein the non-transitory computer-readable medium comprises code causing the first apparatus to determine, based on the first data, rules established between the first distribution processing system and the entity for the first distribution processing system to process distributions for the entity.

19. A method for scanning and mapping entity portals to distribution processing systems, the method comprising:
   scanning a first entity portal of a first distribution processing system to generate first responses of the first entity portal to test distributions, wherein the first entity portal is associated with an entity, and wherein the first distribution processing system processes distributions for the entity;
   receiving, from the first entity portal, the first responses of the first entity portal to the test distributions, wherein the first responses comprise first data associated with distributions processed by the first distribution processing system for the entity;
   determining, based on the first data, first resources offered by the entity to users, a first accounting hierarchy of the entity, and settlement procedures for processing distributions for the entity;
   generating, based on the first resources offered by the entity, based on the first accounting hierarchy of the entity, and based on the first settlement procedures for processing distributions for the entity, a first mapping of the first entity portal to a second distribution processing system;
   providing, to the second distribution processing system, the first mapping of the first entity portal;
   scanning a second entity portal of a third distribution processing system to generate second responses of the second entity portal to the test distributions, wherein the second entity portal is associated with the entity, and wherein the third distribution processing system processes distributions for the entity;
   receiving, from the second entity portal, the second responses of the second entity portal to the test distributions, wherein the second responses comprise second data associated with distributions processed by the third distribution processing system for the entity;
   determining, based on the second data, second resources offered by the entity to users, a second accounting hierarchy of the entity, and second settlement procedures for processing distributions for the entity;
   generating, based on the second resources offered by the entity, based on the second accounting hierarchy of the entity, and based on the second settlement procedures for processing distributions for the entity, a second mapping of the second entity portal to a fourth distribution processing system; and
   providing, to the fourth distribution processing system, the second mapping of the second entity portal.

20. The method of claim 19, wherein the first mapping of the first entity portal configures the second distribution processing system to:
   provide a third entity portal associated with the entity; and
   process distributions entered into the third entity portal in a same manner as the first distribution processing system processes distributions entered into the first entity portal.

\* \* \* \* \*